United States Patent [19]
Schlatter et al.

[11] Patent Number: 6,094,810
[45] Date of Patent: Aug. 1, 2000

[54] OBJECT-SEPARATING DEVICE

[75] Inventors: Manfred Schlatter, Freiburg; Norbert Müller, Friedelsheim; Gerhard Hoefer, Tübingen, all of Germany

[73] Assignee: EMTEC Magnetic GmbH, Ludwigshafen, Germany

[21] Appl. No.: 09/077,361
[22] PCT Filed: Dec. 2, 1996
[86] PCT No.: PCT/EP96/05328
  § 371 Date: Jul. 22, 1998
  § 102(e) Date: Jul. 22, 1998
[87] PCT Pub. No.: WO97/20646
  PCT Pub. Date: Jun. 12, 1997

[30] Foreign Application Priority Data
  Dec. 4, 1995 [DE] Germany ............ 295 19 170 U

[51] Int. Cl.[7] ................. B23P 19/00; B07C 5/00
[52] U.S. Cl. ................. 29/806; 29/709; 209/576; 209/577; 209/588; 414/225.01
[58] Field of Search ................. 209/576, 577, 209/587, 600, 601, 602, 617, 903, 588; 414/908, 225.01, 226.02, 226.05; 29/806, 709, 244, 798, 426.5, 432, 426.3; 312/9.29

[56] References Cited
U.S. PATENT DOCUMENTS

| | | | |
|---|---|---|---|
| 3,802,052 | 4/1974 | Andler et al. | 29/208 |
| 4,171,055 | 10/1979 | Lindgren | 414/412 |
| 4,248,564 | 2/1981 | Gentile et al. | 414/412 |
| 4,564,999 | 1/1986 | Uchlyama et al. | 290/806 |
| 4,586,803 | 5/1986 | Moss et al. | 354/313 |
| 4,621,970 | 11/1986 | Wurfel et al. | 414/412 |
| 4,664,498 | 5/1987 | Moss et al. | 354/313 |
| 4,678,308 | 7/1987 | Moss et al. | 354/313 |
| 5,325,577 | 7/1994 | Bigelow et al. | 29/426.5 |

FOREIGN PATENT DOCUMENTS

| | | | |
|---|---|---|---|
| 469 676 | 2/1992 | European Pat. Off. | |
| 639 406 | 2/1995 | European Pat. Off. | |
| 2 534 705 | 4/1984 | France | |
| 3731314 | 3/1989 | Germany | 414/225 |
| 41 37 568 | 5/1993 | Germany | |
| 1247230 | 7/1986 | U.S.S.R. | 414/225 |

Primary Examiner—Donald P. Walsh
Assistant Examiner—Daniel K Schlak
Attorney, Agent, or Firm—Keil & Weinkauf

[57] ABSTRACT

A device for separating at least one item from a housing part includes a gripping device, a pushing-out means and, if appropriate, a sensing device for identifying the item. The separating device can be used expediently for installations for the disassembly of cassettes or cartridges for audio, video, data or film applications.

5 Claims, 1 Drawing Sheet

OBJECT-SEPARATING DEVICE

FIELD OF THE INVENTION

The invention relates to a separating device for at least one item located in a housing part which is open on one side, partially over an opening in the housing part, in particular a tape reel in a housing part, comprising a gripping device for the item.

For the reprocessing of cassettes of any kind or the recycling of cassettes, it is necessary to separate at least one tape or film reel from at least one housing part in order either to use a new tape or film reel or to separate the plastic material of the housing from that of the tape or film material in order to carry out separate recycling.

DESCRIPTION OF THE RELATED ART

EP-A-639 406 describes a process and apparatuses for reprocessing magnetic tape cassettes. This discloses a separating device for at least one tape reel which separates the latter from a housing part which is open on one side and which device is also intended for transporting the items further by means of a detector device, connected to a movement-controlling means.

FR-A-2 534 705 discloses a device for opening a film cartridge and for removing the film from the cartridge, the film cartridge being fixed on the outer side by a holder and the film together with the reel being pressed out from the film cartridge by means of a ram.

EP-A-554 785 discloses for the recycling of used magnetic tape cassettes opening the cassette housing and removing the tape reels, in that the cassette housing is punched out or milled out around the tape reels and the winding hubs are punched out. In this case, there is no separation of housing material, reel material and tape material, with the result that material separation for recycling according to the particular material still has to take place subsequently.

DE-A-4 137 568 also discloses in the case of ink ribbon cartridges the suction removal of the ink ribbon remaining in the lower part of the cartridge once the cartridge has been destroyed, and separate recycling of said ribbon. Such suction removal is not technically appropriate for magnetic tape cassettes, where several hundred meters of tape are wound up, for reasons of time and with large amounts of tape.

It is therefore an object of the present invention to provide a separating device for items from housing parts, in particular tape or film reels, in which a cost-effective separation of the materials of the housing part and of the tape reels takes place.

SUMMARY OF THE INVENTION

We have found that this object is achieved according to the invention by a separating device of the type described at the beginning if the separating device includes a pushing-out device which comes up against the item through the opening in the housing and moves said item into the region of the gripping device, which separates the item from the housing part.

This achieves a quick separation of reels and housing part and, by means of the gripping device, a specifically directed transporting of the reels can be achieved.

DESCRIPTION OF THE PREFERRED EMBODIMENTS

Figure 2:
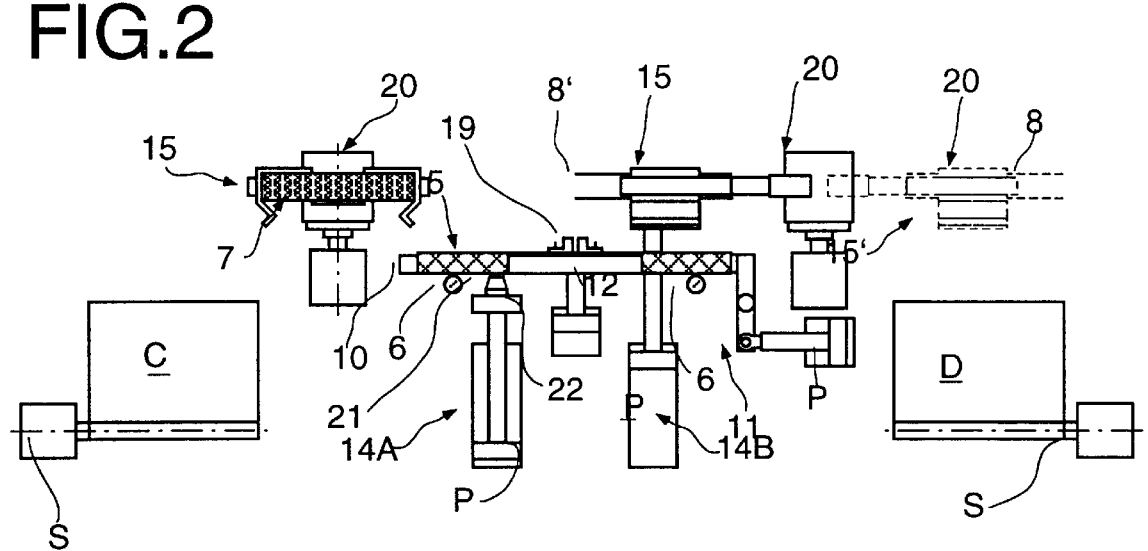
FIG. 2 shows the separating device from FIG. 1 in side elevation according to arrows A-A'.
Figure 1:
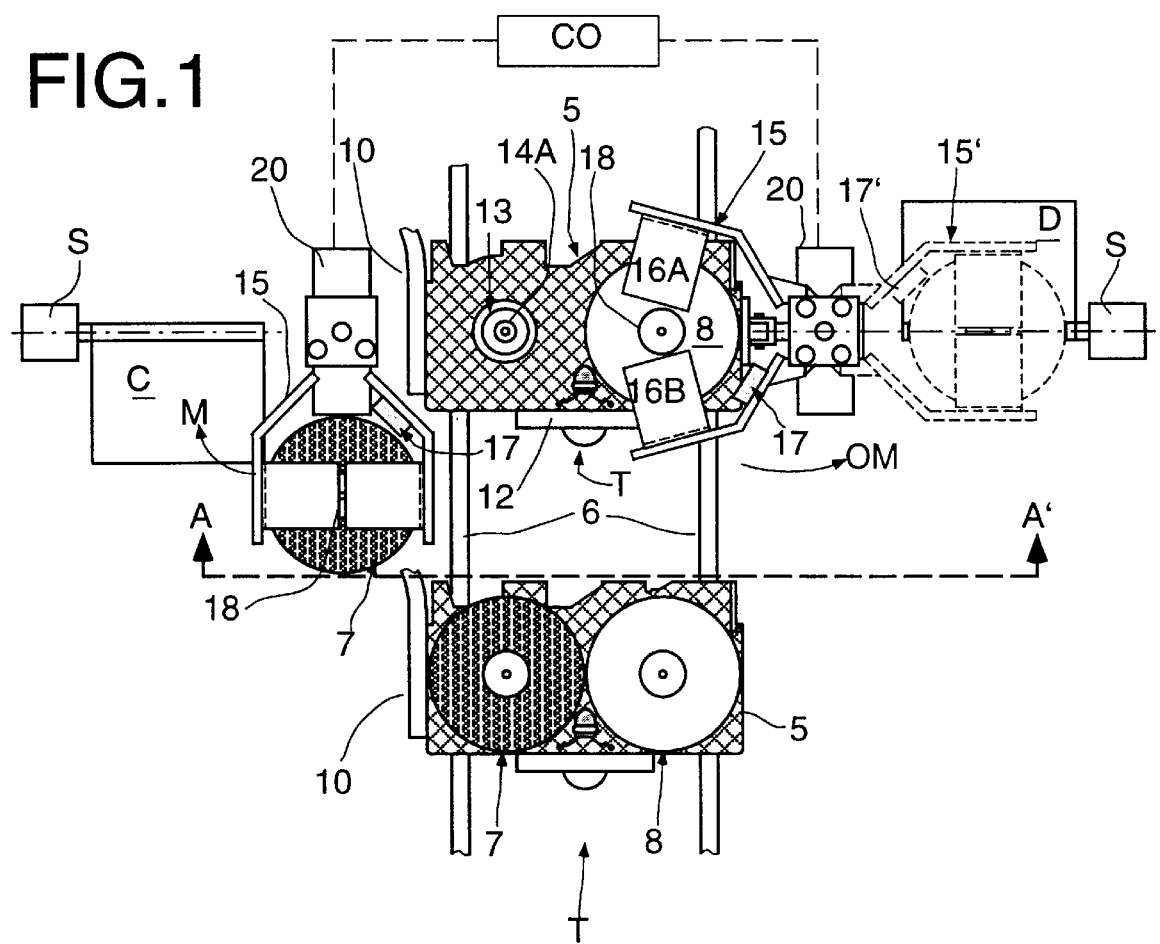
FIG. 1 shows a separating device according to the invention in plan view

In practice, a covering is arranged on the gripping device behind the item in the direction of the pushing-out movement of the pushing-out device. As a result, a safe gripping operation is ensured and the tape reel cannot be pushed away.

The separating device is expediently provided with a detector device for the state of the item. As a result, for example in the case of tape reels, it can be established specifically and at an early time whether the tape reel is empty or still contains tape, and also of which type the tape or the film is. As a result, separating of the reels with and without tape is possible.

It is advantageous to use a sensing device, in particular a light sensing device, as the detector device.

In practice, this sensing device may be provided directly on the gripping device. As a result, the spatial assignment is achieved in a simple way.

Furthermore, the gripping device may be in connection with a movement-controlling means and the sensing signals from the sensing device may be sent to the movement-controlling means and determine the further transport of the item.

As a result, various types of items can be separated from one another using a separating means.

Exemplary embodiments of the invention now are described with reference to the drawings:

The lower housing part 5 of a video cassette is conveyed a long a transporting route (rods 6) in the direction of the arrows T. The lower part 5 contains two tape reels lying next to each other, the left-hand reel 7 with magnetic tape, the right-hand one 8 without magnetic tape, at most with transparent leader tape.

When the reels 7 and 8 arrive at the separating device, the following momentary state exists:

The lower part 5 is restrained by stop 10 and clamping means 11 (and possibly also 12) in a defined position, in which the openings 13 in the lower part are located centrally over the pushing-out device s 14 (14A in the state of rest, 14B in the operating state in FIG. 2).

The grippers 15 are located in the position of the right-hand gripper over each reel 7 and 8, the upper coverings being designed as plates 16A and B.

When the rams of the pushing-out devices 14 are triggered, each reel 7, 8 is pushed into the gripper 15, and the jaws of said gripper close laterally around and over the reel 7, 8, cf. the gripper 15' in the closed position.

The reels 7 and 8 are located, as can be seen in FIG. 2 (reel 8') above the lower part 5 in the gripper 15.

In this position, the sensing device 17, which is advantageously a reflection light sensor on each gripper 15 (model WT5-P112 of the Sick GmbH company, Waldkirch) and is in each case directed radially at the hub 18 of the nearest reel 8, comes into action.

If there is no magnetic tape or only the transparent leader tape present, the hub 18 appears light (the hubs in video cassettes are in most cases seen as "light" since they are white or transparent). If there is even just one layer of magnetic tape present, the hub 18 appears dark. The light sensor thus receives reflection signals of various intensity and generates corresponding different sensing signals, which can be used for controlling the further transport of the reels 7, 8.

Apart from this magnetic tape yes or no decision, it is also possible with a suitably sensitive light sensor to distinguish, for example, tape colors, such as iron oxide tape (brown), chromium dioxide tape (black), metal coated tape (metallic) and on this basis to control corresponding transporting and separating steps by characteristic sensing signals.

In the example represented, the reel 7 detected here, with magnetic tape, is controlled after gripping and retracting of the pushing-out devices 14A and 14B, by means of a corresponding 90° turn of the gripper 15 and a further 90° turn in the direction of the arrow M, in such a way that, after opening of the gripper 15, the reel 7 falls into the container C, which can, for example, be covered by means of a swiveling mechanism S or which may also be a conveyor belt to a magnetic-tape reel collecting point, which belt can also be switched over to another conveyor belt by means of the swiveling mechanism S.

In the example, the right-hand reel 8 is without tape and the gripper 15 has already been swiveled by means of the sensing signal of the light sensor 17 along the arrow OM into the position 15', with the result that a container D or conveyor belt for reels without magnetic tape is ready for receiving. In the converse situation in which there is tape present on the reel 8, the reel 7 may be conveyed into the container D for empty reels and the full reel 8 may be conveyed into the container C for it. If appropriate, two empty reels or two full reels (if present) may also be conveyed into the respective containers C or D.

After removal and separation of the reels 7 and 8, the lower part 5 is transported further and the small parts still on it, for example the braking means 19 shown, are removed. Thereafter, the lower part itself may be sent to a collecting container by means of correspondingly suitable gripping means or the like. (Although not shown, the devices described above for the reels can also be used correspondingly for this.)

The individual devices described above may include the following suitable driving or mechanical means:

The pushing-out devices 15 are moved by means of pneumatic or hydraulic cylinder units P.

The grippers 15 include a moving mechanism and driving unit, denoted by 20. An industrial robot, which substantially comprises a manipulator (the actual robot) and a control unit, the latter being supplied with the program of movements by a personal computer, can also be used.

The positioning and clamping means 11 is likewise moved by means of a pneumatic or hydraulic cylinder unit P. The swiveling mechanisms S may include a swivel drive.

All the means may be controlled with respect to the spatial and temporal sequence of the reel-separating operation by a central or else coupled individual control means CO, which is indicated in FIG. 2 and is connected to the moving and driving units W of the grippers 15. This control means Co may expediently include a microprocessor, which determines the program of movements of the control means.

The following modifications of the embodiment of the separating device described above are also possible.

Gripper 15

It is possible in principle to use a 3-finger outer gripper for the upper hub, if present, or an inner gripper for flangeless hubs, for gripping and/or pushing out the reels.

If the reels have upper flanges without clearances, a suction-gripping means may also be used for gripping and/or pushing out the reels.

Parallel to the covering plates 16A, B, the grippers 15 may have lower attachments for gripping under the lower reel flange, if present, with the result that the jaws have partially the form of a U.

Pushing-out devices 14

The rams are expediently designed with a pin 21, which engages in the central opening of the reels 7, 8, and a holding plate 22 arranged thereunder.

Sensing device 17

It is possible in principle to use an infrared red (IR) light sensor instead of a normal light sensor.

The separating device described above was tested and yielded the following favorable results, the few errors of decision being tolerable.

Reels 7, 8 of different diameter (from empty to full) were sent to the gripper 15. The response of the sensor 17 was correct, apart from very few exceptions. Only the classifying of an empty reel as a full reel, and not vice versa, occurred as errors. An empty reel with a black tape clip was always declared to be full if the clip pointed in the direction of the sensor 17. The wrong decision was also made in the case of an empty red reel on account of the relatively dark color, whereas an empty yellow reel with a large hub diameter was correctly classified. Black tape clips and colored reels are relatively rare, however. The case in which magnetic tape is wrapped halfway around on the side opposite the sensor leads to errors cannot occur on account of the position of the sensor and the winding direction of the tape. The transparent leader tape does not disturb the identification process.

Use of the separating device according to the invention in an automatic magnetic tape or film cassette disassembly installation is very advantageous and favors their cost-effective use, in particular for recycling installations.

We claim:

1. A separating device for at least one item located in a housing part which is open on one side, partially over an opening in the housing, comprising a gripping device for the item, the separating device including a pushing-out device, which comes up against the item through the opening in the housing and moves said item into the region of the gripping device, which separates the item from the housing part, wherein there is provided a detector device, which identifies the state of the item by sensing signals, and wherein the gripping device is in connection with a movement-controlling means and the sensing signals are sent from the detector device to the movement-controlling means and determine the further transport of the item.

2. A separating device for at least one item located in a housing part, as claimed in claim 1, wherein the item is a magnetic tape reel.

3. A device for separating at least one tape reel from a housing part, as claimed in claim 2, wherein the state of whether a full or empty tape reel is present is established by means of a sensing device as a detector device.

4. A device for separating at least one magnetic tape reel from a housing part as claimed in claim 2, wherein the state of whether an iron oxide, chromium dioxide or metal coated magnetic tape is present is established by means of a sensing device as a detector device.

5. A separating device as claimed in claim 2, wherein the sensing device is provided directly on the gripping device.

* * * * *